(12) United States Patent
Chen (10) Patent No.: US 8,842,367 B2
(45) Date of Patent: Sep. 23, 2014

(54) SUPERIMPOSED LENS MODULE WITH LENS ARRAY

(75) Inventor: Kuan-Ming Chen, Taichung (TW)

(73) Assignee: Largan Precision Co., Ltd, Taichung (TW)

( * ) Notice: Subject to any disclaimer, the term of this patent is extended or adjusted under 35 U.S.C. 154(b) by 22 days.

(21) Appl. No.: 13/541,027

(22) Filed: Jul. 3, 2012

(65) Prior Publication Data

US 2013/0176625 A1 Jul. 11, 2013

(30) Foreign Application Priority Data

Jan. 9, 2012 (TW) .............................. 101100763 A (51) Int. Cl.
*G02B 27/00* (2006.01)

(52) U.S. Cl.
USPC .......................................................... 359/618

(58) Field of Classification Search
USPC .......................................................... 359/618
See application file for complete search history.

(56) References Cited

U.S. PATENT DOCUMENTS

| 7,187,501 | B2 | 3/2007 | Wakisaka | |
|---|---|---|---|---|
| 8,023,208 | B2 | 9/2011 | Shyu et al. | |
| 2004/0212719 | A1* | 10/2004 | Ikeda | 348/340 |
| 2010/0014170 | A1* | 1/2010 | Shyu | 359/718 |
| 2010/0157428 | A1* | 6/2010 | Wu et al. | 359/622 |
| 2010/0284077 | A1* | 11/2010 | Shyu et al. | 359/503 |

* cited by examiner

*Primary Examiner* — James Jones
(74) *Attorney, Agent, or Firm* — Morris, Manning & Martin LLP; Tim Tingkang Xia, Esq.

(57) ABSTRACT

The present invention provides a multiple-layered lens array assembly comprising: at least a lens array set comprising a plurality of lens units, each of the lens units having an engaging surface surrounding an optical axis thereof and formed on an object-side surface or an image-side surface thereof; and at least an independent lens unit having an engaging surface surrounding an optical axis thereof and formed on an object-side surface or an image-side surface thereof; wherein the engaging surface of each of the lens units of the at least an lens array set connects with the engaging surface of a corresponding independent lens unit.

14 Claims, 9 Drawing Sheets

SUPERIMPOSED LENS MODULE WITH LENS ARRAY

CROSS-REFERENCE TO RELATED APPLICATIONS

This non-provisional application claims priority under 35 U.S.C. §119(a) on Patent Application No. 101100763 filed in Taiwan R.O.C on Jan. 9, 2012, the entire contents of which are hereby incorporated by reference.

FIELD OF THE INVENTION

The present invention relates to a lens module comprising a plurality of lens arrays superimposed in a multiple-layered structure, and more particularly, to a miniature lens module comprising a plurality of lenses superimposed in a multiple-layered structure and applicable to a camera module or a photographing module of a handheld device, such as a tablet computer, a mobile phone, or a personal digital assistant (PDA) and etc.

DESCRIPTION OF RELATED ART

In recent years, the production of lens array becomes easier because of the advances in the development of the lens precision molding technology. A multiple-layered lens array assembly made by stacking multiple lens arrays is widely used in light switch-type detection devices and miniature optical lens modules of mobile phone cameras, portable computers, personal digital assistant (PDAs), and etc.

Multiple-layered lens array assembly is an optical lens module composed of multiple optical lenses having different diopters and stacked with a certain air interval therebetween. Therefore, when multiple optical lenses having different dioptres are to be combined, it requires precise alignment of the optical axes thereof to avoid the reduction of resolution, and a space interval is required to space one optical lens from another. Because the combination of multiple lenses requires numerous procedures and precise alignment, it is difficult to reduce the manufacturing cost and achieve a high yield. Furthermore, because the misalignment of the optical axes of the multiple lenses will affect optical effects, the precise alignment for the optical axes is more complicated and important.

Figure 1A:
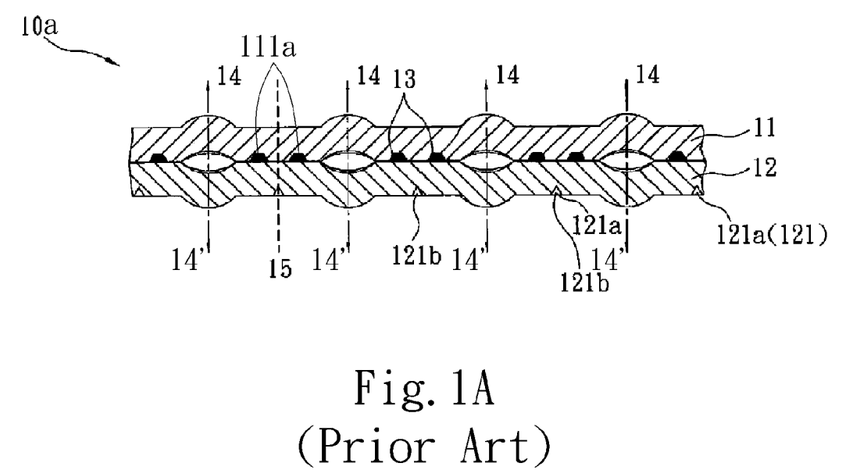
FIG. 1A is a diagram illustrating a prior art multiple-layered lens array module.

U.S. Pat. No. 8,023,208 provides a miniature stacked optical glass lens module 10a, as shown in FIG. 1A. The optical glass lens module comprises an optical lens array 11 on which a plurality of lenses 14 are formed and an optical lens array 12 on which a plurality of array lenses 14' are formed. The optical lens arrays 11 and 12 are stacked to form a stacked lens module 10, wherein the optical lens arrays 11 and 12 are stacked with glue grooves 111a filled with glue 13 and then cut along positioning notches 121. However, when a number of optical lens arrays 11 and 12 are stacked sequentially, there is no alignment mechanism for the glue grooves 111a and the positioning notches 121, thus the alignment of the optical axes of the stacked miniature lenses cannot be assured after the number of lens arrays have been stacked. Therefore, the efficiency of the method seems high, but the yield is very low. This is because a high-resolution lens requires a high optical axis alignment accuracy, and it is difficult to guarantee precise alignment of the optical axes of the stacked lenses having respective optical axes when a lens of a lens array is stacked on a lens of another lens array and thus the yield is low. Moreover, when the number of stacked lenses increases, the alignment inaccuracy of the optical axes will accumulate, so that the yield will be even lower.

Figure 1B:
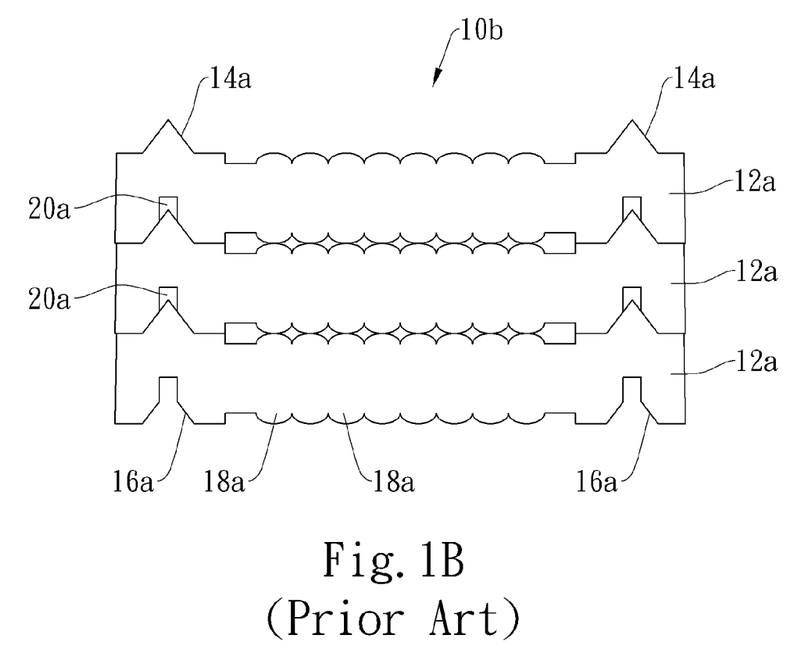
FIG. 1B is a diagram illustrating another prior art multiple-layered lens array module.

U.S. Pat. No. 7,187,501 provides another multiple-layer stacked lens module 10b. As shown in FIG. 1B, a plurality of miniature lenses 18a form an array on a central optical zone of each of the object-side surface and the image-side surface of each lens plate 12a. A plurality of cone-shaped projections 14a are provided around one side surface of each lens plate 12a, and a plurality of depressions 16a and 20a are provided on the other side surface of each lens plate 12a. The multiple-layer stacked lens module 10b is formed by stacking the lens plates 12a one over another through fitting these projections 14a and depressions 16a, 20a to each other. However, after stacking the lens plates 12, the optical axis of each miniature lens 18 of an upper lens plate 12a cannot be precisely aligned with the optical axis of each miniature lens 18a of a lower lens plate 12a.

In view of the drawbacks in prior art, there is a need for a multiple-layer stacked lens module that can enhance the precision of the alignment of optical axes of the stacked lens arrays so as to increase the yield and reduce costs, thereby facilitating the production of high-resolution optical modules and providing a wide range of application.

BRIEF DESCRIPTION OF THE INVENTION

An object of the present invention is to provide a multiple-layered lens array assembly based on a lens array set having engaging surfaces co-axial with the optical axis on the object-side surface and the image-side surface thereof. A plurality of independent lens units are stacked on the engaging surfaces of the lens array set to form a plurality of lens systems, thereby respective optical axes of the stacked lenses can be aligned easily, the precision can be improved, and the interference between the lenses arranged in a stack can be prevented. Consequently, the yield of the present invention can be increased.

More specifically, an object of the present invention is to provide a lens array set in which multiple layers of lens units are stacked continuously on the object-side surface and the image-side surface thereof. As the lens array set has engaging surfaces co-axial with the optical axis, this provides a self-alignment means for other independent lens units continuously stacked thereon. After continuously stacking the independent lens units on the lens array set, the optical axis of each independent lens unit can be accurately aligned with the optical axis of the corresponding lens unit of the lens array set, thus respective optical axes of the stacked lenses of each optical system of the multiple-layered lens array assembly of the present invention can be aligned precisely, and no additional jig or retaining means is required to position each lens.

To achieve the above-mentioned object, the present invention provides a multiple-layered lens array assembly comprising: at least a lens array set comprising a base and a plurality of lens units arranged in an array within the base, each one of the plurality of lens units comprising an optical axis and an engaging surface formed on each of the object-side surface and the image-side surface thereof and surrounding the optical axis; and a plurality of independent lens units, each one of the plurality of independent lens units comprising a base, an optical axis and an engaging surface formed on each of the object-side surface and the image-side surface thereof and surrounding the optical axis; wherein each one of the plurality of independent lens units is respectively engaged with the object-side surface or the image-side surface of the lens array set; and wherein the engaging surface of the lens array set respectively engages with the engaging surface of the corresponding independent lens unit, so as to accurately align the optical axes of each one of the plurality of independent lens units with the optical axes of the mating lens array set.

DETAILED DESCRIPTION OF THE INVENTION

The present invention will now be described with detailed embodiments. The following embodiments do not intend to confine the invention relevant to the scope of claims. Also, all combinations of the features described in the embodiments are not necessarily included in the solutions of the present invention.

Figure 2:
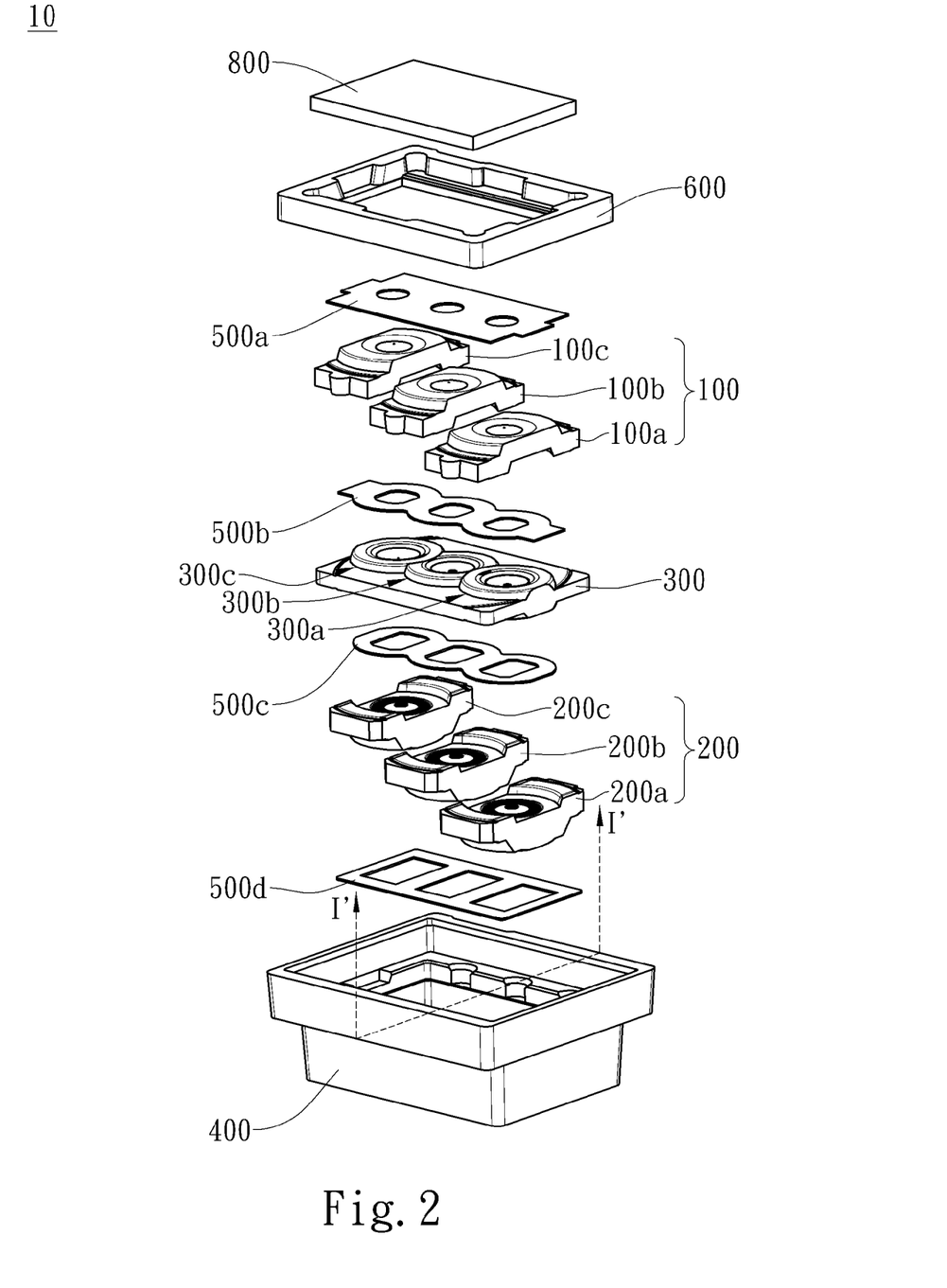
FIG. 2 is a perspective exploded view of a multiple-layered lens array assembly in accordance with an embodiment of the present invention.

FIG. 2 is a perspective exploded view of a multiple-layered lens array assembly 10 in accordance with an embodiment of the present invention. The multiple-layered lens array assembly 10 comprises, from top to bottom, a filter 800, a press frame 600, a first light shielding element 500a, a first independent lens group 100, a second light shielding element 500b, a lens array set 300, a third light shielding element 500c, a second independent lens group 200, a forth light shielding element 500d and a lens barrel 400, wherein the first independent lens group 100 comprises three first independent lens units 100a, 100b and 100c, and the second independent lens group 200 comprises three second independent lens units 200a, 200b and 200c. The above-mentioned components are assembled within the lens barrel 400 in an order along a single direction.

Figure 5:
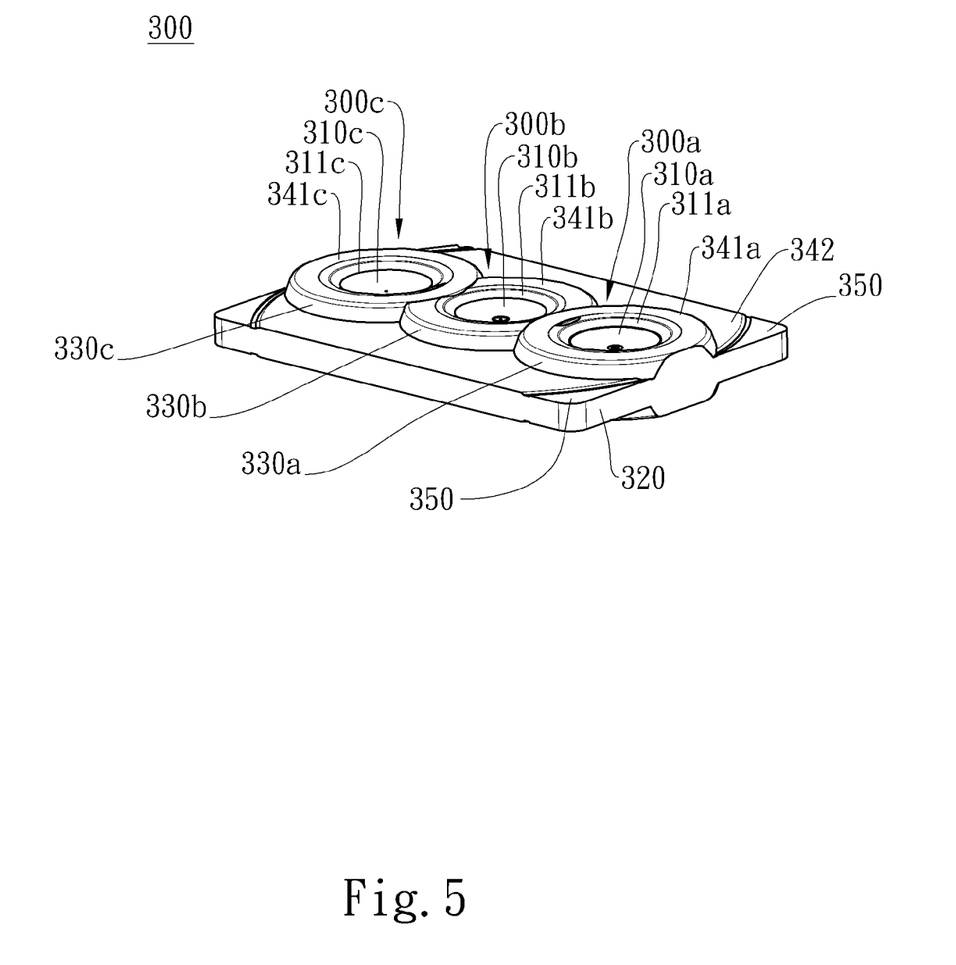
FIG. 5 is a perspective view of the lens array set in accordance with the embodiment of the present invention shown in FIG. 2.

FIG. 5 is a perspective view of the lens array set 300 shown in FIG. 2. The lens array set 300 is composed of a base 320 and a plurality of lens units 300a, 300b and 300c and integrally formed within the base 320. The base 320 has a length and a width the same as the length and the width of the inner walls of the lens barrel 400, so that it abuts against and is fixed to the corresponding inner walls of the lens barrel 400 after the lens array set 300 has been assembled within the lens barrel 400. The first independent lens group 100, the second independent lens group 200 and the lens array set 300 can be made from a plastic material suitable for injection molding process, such as Polymethyl Methacrylate (PMMA), Polycarbonate (PC) for optical applications, Zeonex® produced by Zeon Corporation, NAS plastic, TPS plastic, CR39 plastic and so on. The mold tools used can be made from a steel material suitable for injection molding of the lens, such as SCM2 Chrome-molybdenum steel, SCM3 Chrome-molybdenum steel, SCM4 Chrome-molybdenum steel, Sweden ASSAB S-7 Chrome-molybdenum steel, STAVAX high chromium stainless steel, ASSAB-8407 Microdized steel and so on. The lens array set 300 and the independent lens units 100a-100c and 200a-200c are formed integrally through the injection molding process. The injection molding process comprises: heating the plastic material to the melting point, applying high pressure to the molten plastic material so as to inject the molten plastic material into the cavities of the mold tools, cooling the molten plastic material until the formation of lenses is complete and ejecting the lenses by separating the upper and the lower mold tools. With the cavities of the mold tools, three lens units 300a-300c are formed and arranged in an array on the mid-portion of the base 320 of the lens array set 300 which can be used as an optical portion, and an engaging surfaces 330 and a conjugation surface 340, which are co-axial with the optical axis of the lens, are formed at the periphery of each one of the three lens units 300a-300c. The three lens units 300a-300c, the engaging surface 330, the conjugation surface 340 and the base 320 are formed integrally. Preferably, the mold tools are also formed integrally.

Figure 4:
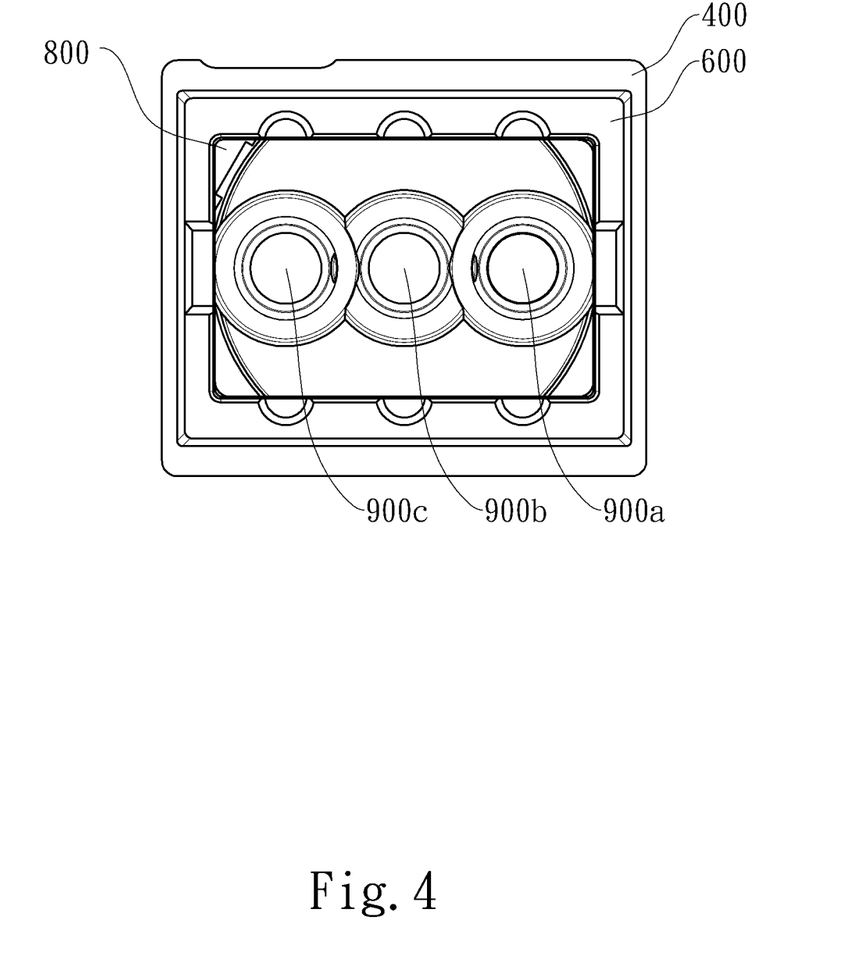
FIG. 4 is a top view of the multiple-layered lens array assembly in accordance with the embodiment of the present invention shown in FIG. 2.

More specifically, each of the lens units 300a-300c comprises a corresponding one of optical surfaces 310a-310c serving as effective light passing areas, and each optical surface has an optical axis. Regarding the lens unit 300a, its optical surface 310a is surrounded by a first conjugation surface 341a co-axial with the optical axis of the lens unit 300a, wherein the first conjugation surface 341a and the optical surface 310a are joined with a joint surface 311a, and wherein the first conjugation surface 341a and a second conjugation surface 342 are joined with an engaging surface 330a, which is an inclined plane projecting from the surface of the base 320. The first conjugation surface 341a and the second conjugation surface 342 are horizontal surfaces formed on each of the object-side surface and the image-side surface. Similarly, the optical surface 310b of the lens unit 300b is surrounded by a horizontal first conjugation surface 341b co-axial with the optical axis of the lens unit 300b and an inclined engaging surface 330b projecting from the base 320, wherein the first conjugation surface 341b and the optical surface 310b are joined with a joint surface 311b, and wherein the first conjugation surface 341b and the second conjugation surface 342 are joined with the engaging surface 330b projecting from the base 320. The optical surface 310c of the lens unit 300c is surrounded by a horizontal first conjugation surface 341c co-axial with the optical axis of the lens unit 300c and an inclined engaging surface 330c projecting from the base 320, wherein the first conjugation surface 341c and the optical surface 310c are joined with a joint surface 311c, and wherein the first conjugation surface 341c and the second conjugation surface 342 are joined with the engaging surface 330c projecting from the base 320. As shown in FIG. 4, the angle of the joins of the first conjugation surfaces 341a, 341b and 341c can be determined from the distances between the lens units 300a, 300b and 300c of the lens array set 300. Furthermore, an ejection surface 350 with a height lower than that of the second conjugation surface 342 is provided on the base 320 between each of the four corners of the base 320 and the second conjugation surface 342, wherein four draft angles 351 are provided between the second conjugation surface 342 and the ejection surfaces 350, and a plurality of minute shrinkage pools 352 are provided on the joins between the first conjugation surfaces 341a, 341b and 341c. The ejection surfaces 350, the draft angles 351 and the shrinkage pools 352 are utilized to facilitate the ejection of the lens array set 300 from the mold tools after the molding has been completed.

Figure 6A:
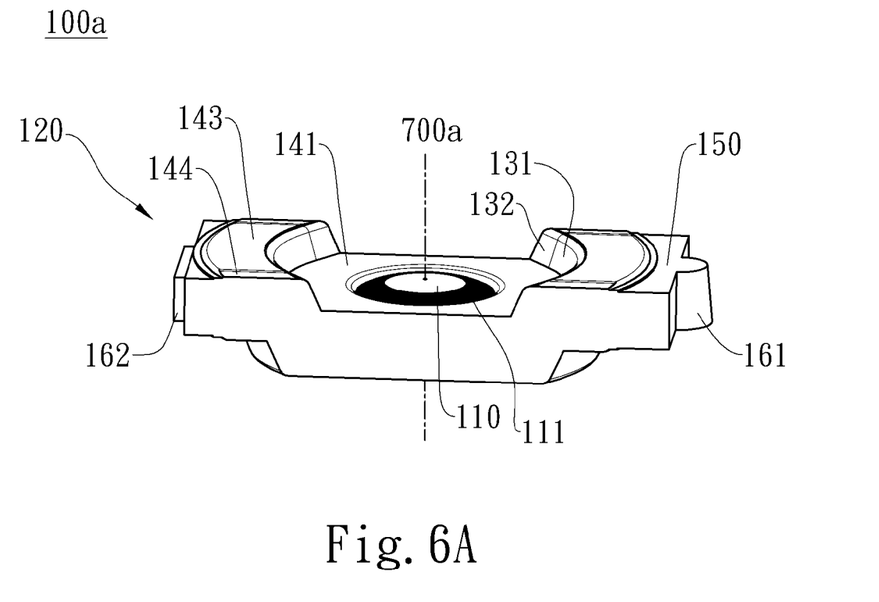
FIG. 6A is a perspective view of the first independent lens unit viewed from the image-side surface in accordance with the embodiment of the present invention shown in FIG. 2.
Figure 6B:
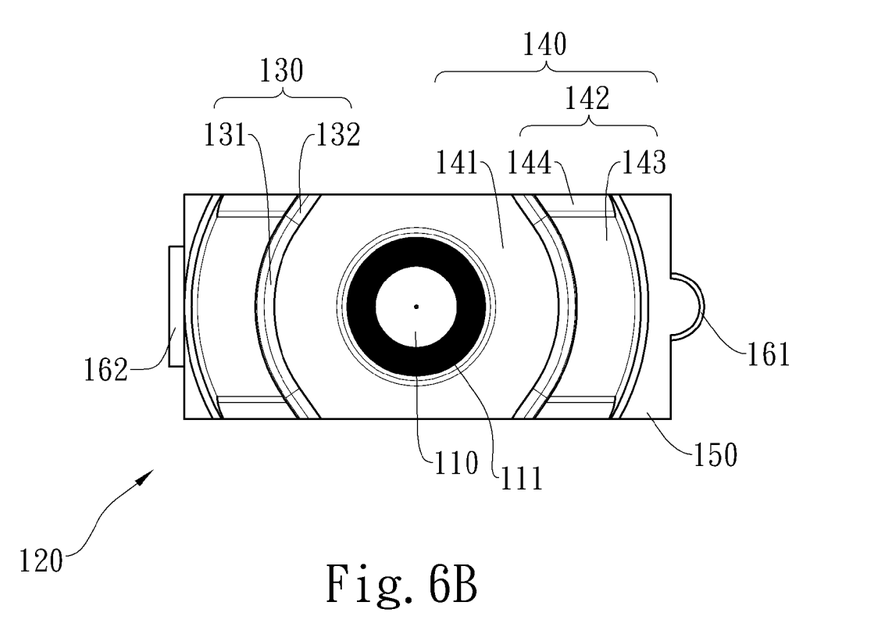
FIG. 6B is a top view of the first independent lens unit viewed from the image-side surface in accordance with the embodiment of the present invention shown in FIG. 2.

FIG. 6A and FIG. 6B are a perspective view and a top view illustrating the first independent lens unit 100a viewed from the image-side surface in accordance with the embodiment of the present invention. In this embodiment, the first independent lens unit 100a is mated with the lens unit 300a of the lens array set 300 through the image-side surface thereof. As shown in FIG. 6B, the first independent lens unit 100a comprises a lens 110 serving as an optical zone and formed at the center thereof, a lens joint surface 111, an engaging surface 130, a conjugation surface 140, a ejection surface 150 disposed on both sides and a first flange 161 and a second flange 162.

The engaging surface 130 of the first independent lens unit 100a is an inclined plane extending inwardly so as to engage with the engaging surface 330a of the lens unit 300a in a snap-fit manner. The conjugation surface 140 further comprises a first conjugation surface 141 and a second conjugation surface 142, both of which are horizontal surfaces. The engaging surface 130, the first conjugation surface 141 and the middle portion 143 of the second conjugation surface 142 surround the lens 110 and are coaxial with the optical axis 700a of the lens 110. That is, the engaging surface 130, the first conjugation surface 141 and the middle portion 143 of the second conjugation surface 142 are co-centric with the lens 110.

It should be emphasized that the surface of the first independent lens unit 100a that engages with the lens unit 300a is transcribed by the same mold tools that process the lens unit 300a, and this renders the first independent lens unit 100a a surface configuration exactly complementary to (matching) the surface configuration of the lens unit 300a. Such an arrangement ensures that the engaging surface of the first independent lens unit 100a and the corresponding engaging surface of the lens unit 300a are held in precise coaxial relationship with each other when the first independent lens unit 100a is superimposed on the lens array set 300, so that the misalignment of the optical axis 700a can be prevented (i.e. the misalignment of the optical axis 700a and the optical axis of the lens unit 300a can be prevented). Thus, precise processing machines such as mold tools can affect the self-alignment of the lenses and control the inaccuracy of the stacked lenses. Consequently, it is unnecessary to utilize a jig or other optical axis alignment means to correct the inaccuracy after the lenses have been assembled.

Figure 6C:
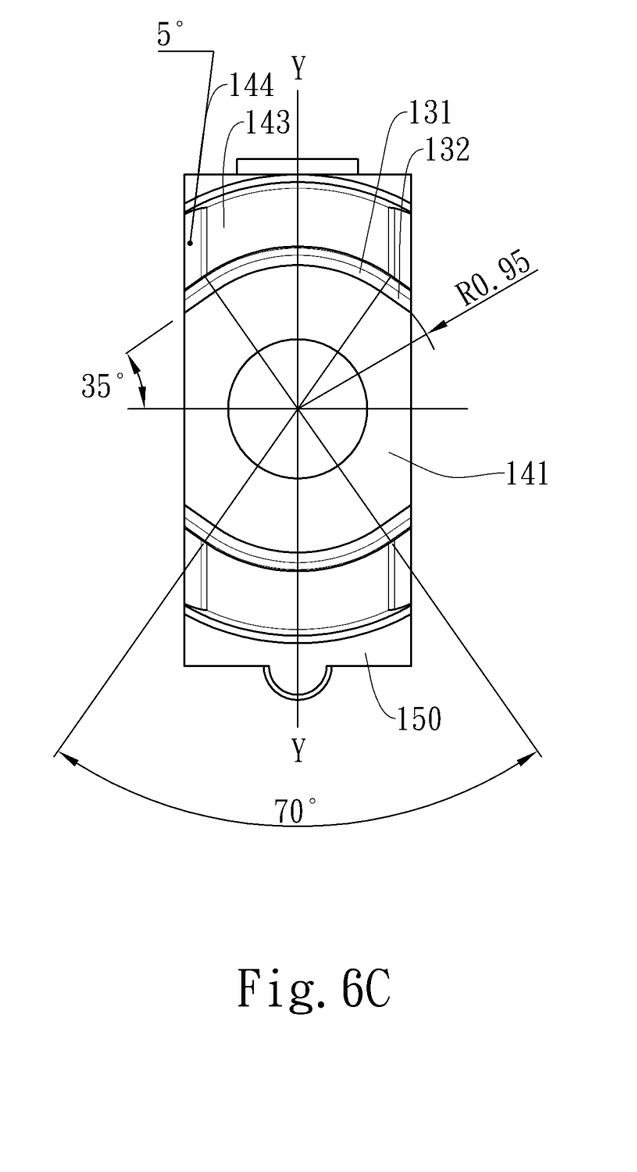
FIG. 6C is a schematic representation of the first independent lens unit viewed from the image-side surface in accordance with the embodiment of the present invention shown in FIG. 2.

Furthermore, because the precision of the joins between the first conjugation surfaces 341a, 341b and 341c of the lens units 300a-300c of the lens array set 300 are uneasy to control, the precision of the aforementioned joins during the transcription are also uneasy to control when the mold tools of the lens units 300a-300c of the lens array set 300 are used to transcribe the surfaces of the first independent lens units 100a-100c and the second independent lens units 200a-200c. To overcome such a difficulty, the engaging surface 130 of the first independent lens unit 100a is provided with two end portions 132 on both ends thereof and a middle portion 131 on the middle thereof, as shown in FIGS. 6B and 6C. As shown in FIGS. 6B and 6C, the curvature of the middle portion 131 of the engaging surface 130 is determined by drawing a fixed first curvature radius, for example R0.95 (cm), from the center of the lens 110 and respectively expanding it at 35 degrees toward the two sides in the Y-Y axial direction of the first independent lens unit 100a. Each of the two end portions 132 has a curvature. The curvature of each of the two end portions is smaller than the curvature of the middle portion. The curvature of the end portion 132 can be determined by a curvature radius greater than the curvature radius of the middle portion 131, or by a tangent line extending from the distal end of the curvature of the middle portion 131 to the rim of the base of the independent lens.

As shown in FIGS. 6A and 6C, the second conjugation surface 142 is further divided into a horizontal middle portion 143 and two inclined end portions 144 arranged respectively at both sides thereof, wherein the end portions 144 projecting from the surface of the base and inclined at an angle of 5 degrees to connect the horizontal middle portion 143 are positioned at four internal corners of the base of the independent lens unit 100a. By such an arrangement, the inclined end portions 144 can absorb the inaccuracy in the joins between the first independent lens unit 100a and the corresponding lens unit 300a of the lens array set 300. The base of the first independent lens unit 100a is also provided with an ejection surface 150 disposed at an outer periphery of the conjugation surface 140 and located at a height lower than the top surface of the horizontal middle portion 143. The lenses can be easily ejected from the mold tools through the arrangement of the 5 degree draft angles of the inclined end portions 144 and the ejecting surface 150 after being molded and cooled. The arrangement of the ejecting surface 150 also prevents ragged edges from forming on the lenses during the molding process, thus air gaps and the inclination of the optical axes can be avoided.

Figure 7A:
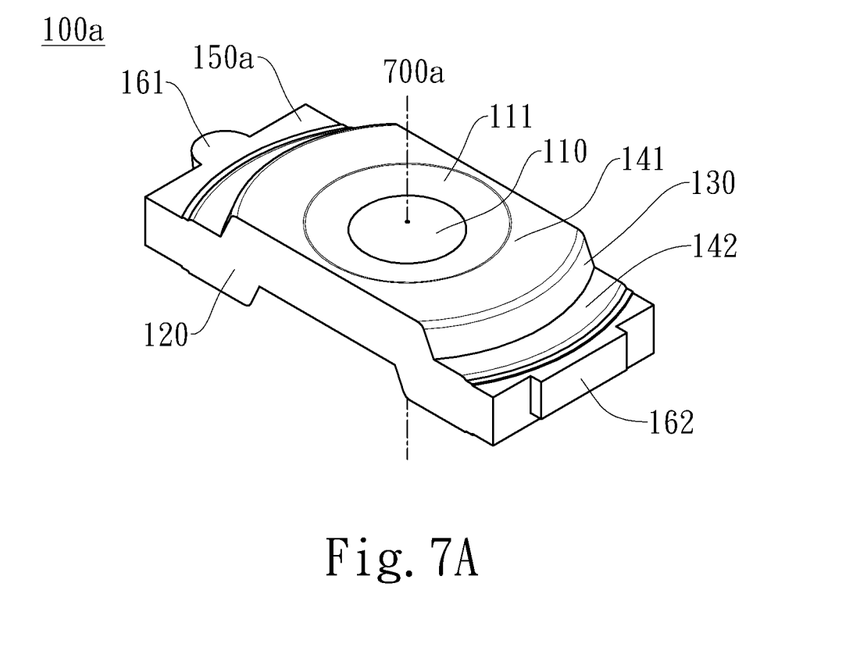
FIG. 7A is a perspective view of the first independent lens unit viewed from the object-side surface in accordance with the embodiment of the present invention shown in FIG. 2.
Figure 7B:
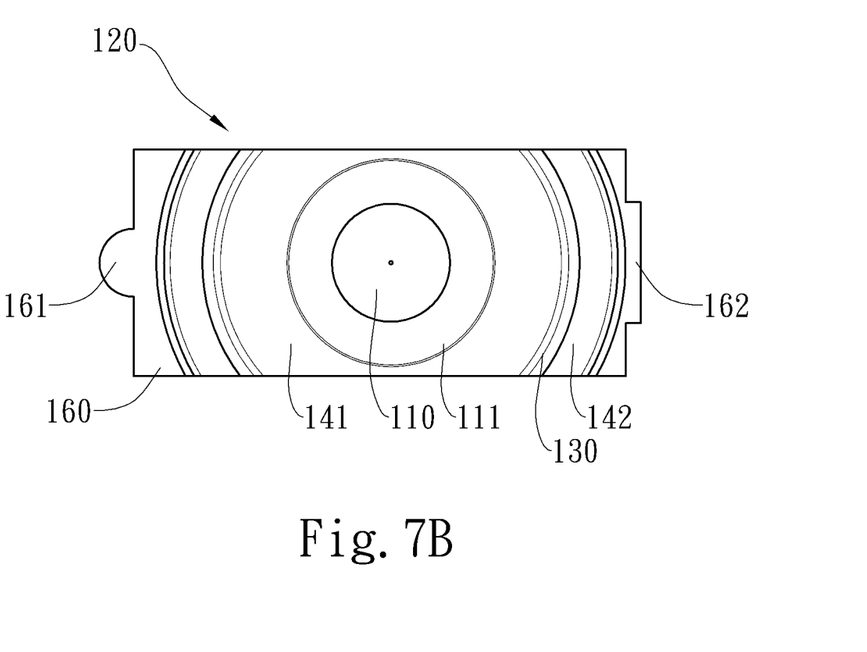
FIG. 7B is top view of the first independent lens unit viewed from the object-side surface in accordance with the embodiment of the present invention shown in FIG. 2.

FIGS. 7A and 7B are a perspective view and a top view illustrating the first independent lens unit 100a viewed from the object-side surface in accordance with the embodiment of the present invention shown in FIG. 2. In the embodiment, the object-side surface of the first independent lens unit 100a engages with another independent lens unit. An engaging surface 130, a first conjugation surface 141, a second conjugation surface 142 and an ejecting surface 150 are formed sequentially on an outer periphery of the lens 110 at the object-side surface of the base 120, wherein the top of the first conjugation surface 141 is located at a height higher than the second conjugation surface 142, and the engaging surface 130 is an inclined plane projecting from the base 120. More specifically, the engaging surface 130, the first conjugation surface 141 and the second conjugation surface 142 are coaxial with the optical axis 700a of the lens 110 and surround the optical axis 700a with a radius of a concentric circle. A lens joint surface 111 is used to join the lens 110 and the first conjugation surface 141 at the object-side surface. When the first independent lens unit 100a engages with another independent lens unit (not shown), the first and second conjugation surfaces 141 and 142 engage with the horizontal conjugation surfaces of the independent lens unit, and the engaging surface 130 engages with the engaging surface of the independent lens unit, so that the self-alignment of the optical axes of the first independent lens unit 100a and the independent lens unit can be effected and the misalignment of axes can be effectively avoided.

Figure 3:
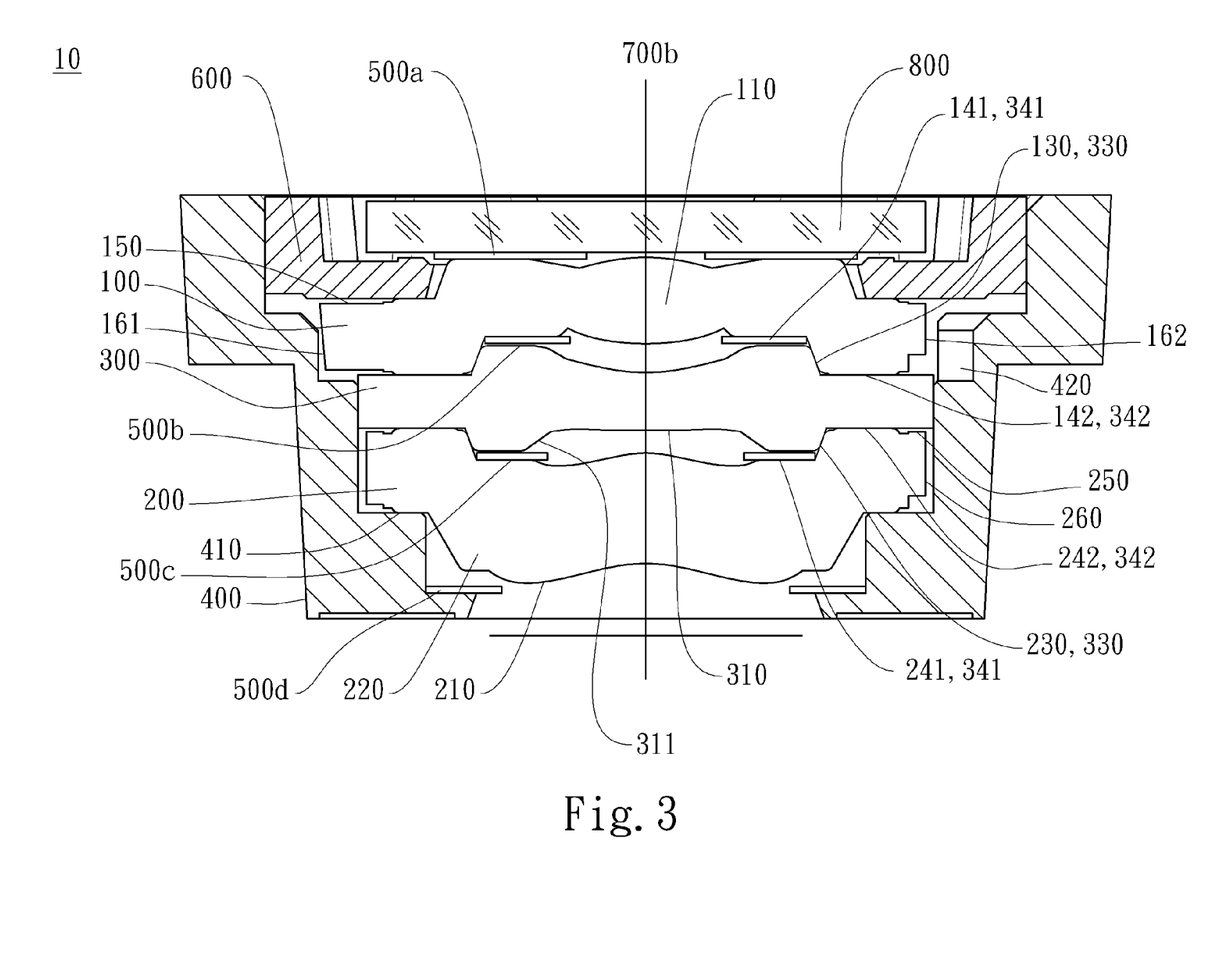
FIG. 3 is a section view of the multiple-layered lens array assembly taken along the line I'-I' in FIG. 2.

Referring to FIG. 3, each one of the second independent lens units 200a, 200b and 200c of the embodiment comprises a lens 210 having an optical axis and serving as an optical zone on the object-side surface of the base 220, an engaging surface surrounding the optical axis of the lens 210 and configured to engage with the lens array set 300, a first conjugation surface 241, a second conjugation surface 242 and two flanges 260 on both sides of the object-side surface of the base 220. The engaging surface of each one of the second independent lens units 200a-200c, like that of the first independent lens unit, is transcribed by the mold tools that process the lens unit 300a of the lens array set 300, and this renders the second independent lens unit 200a a surface configuration exactly complementary to the surface configuration of the lens unit 300a. That is, the engaging surface 330 on the image-side surface of the lens unit 300 extends outward. Each one of the second independent lens units 200a-200c is provided with an engaging surface 230, which extends inwardly relative to the engaging surface 330 on the image-side surface of the lens unit 300a and abuts against the engaging surface 330. The horizontal first and second conjugation surfaces 241 and 242 horizontally abut against the horizontal first and second conjugation surfaces 341 and 342 on the image-side surface of the lens unit 300a. By the engaging surfaces 230 and 330, the first conjugation surfaces 241 and 341 and the second conjugation surfaces 242 and 342, which are co-centric with respect to the optical axis, the second independent lens unit 200a and the lens unit 300a can be held in precise coaxial relationship with each other after the lens unit 300a has been superimposed on the second independent lens unit 200a, so that the inclination of the optical axis 700a can be prevented. Thus, the self-alignment of the lenses and the control of the inaccuracy of the stacked lenses can be effected by the precise processing machines such as the mold tools. Consequently, it is unnecessary to utilize a jig or other optical axis alignment means to correct the inaccuracy after the lenses have been assembled.

The assembling of the multiple-layered lens array assembly 10 in accordance with the embodiment of the present invention is shown in FIG. 3, a section view of the multiple-layered lens array assembly 10 taken along the line I'-I' in FIG. 2. The lens barrel 400 can be provided with an image sensor (not shown) at its image side, an opening and inner walls at its object side, a horizontal pedestal 410 and a shrinkage pool 420, wherein the inner walls form an accommodation space, the horizontal pedestal 410 is disposed near the bottom of the inner walls and extends toward the center of the lens barrel 400, and the shrinkage pool 420 is disposed above the horizontal pedestal 410.

The procedure of assembling the multiple-layered lens array assembly 10 will be illustrated below. First, the fourth light shielding element 500d is assembled within the lens barrel 400. Next, the second independent lens units 200a-200c are placed respectively into the lens barrel 400 with their respective bases 220 abutting against the horizontal pedestal 410, so that the second independent lens units 200a-200c can be held in horizontal positions. The flanges 260 are spaced from the inner walls of the lens barrel 400 so that the second independent lenses 200a-200c can make a translational movement at the horizontal positions.

Next, the third light shielding element 500c is assembled within the lens barrel 400 and arranged above the first conjugation surfaces 241 of the second independent lens units 200a-200c.

Next, the lens array set 300 is assembled within the lens barrel 400 with the outer periphery of its base engaged with and fixed to the inner walls of the lens barrel 400. The engaging surfaces 330a-330c of the lens units 300a-300c are engaged with the engaging surfaces 230a-230c of the second independent lens units 200a-200c, and the first conjugation surfaces 241a-241c and the second conjugation surfaces 242a-242c are engaged respectively with the first conjugation surfaces 341a-341c and the second conjugation surfaces 342a-342c on the image-side surfaces of the lens units 300a-300c, so as to cause the second independent lens units 200a-200c to move horizontally to the positions where the optical axes 700a, 700b (not shown) and 700c (not shown) of the second independent lens units 200a-200c are in alignment with the optical axes of the lens units 300a-300c. Next, the second light shielding element 500b is assembled within the lens barrel 400 and arranged above the first conjugation surface 341 on the object-side surface of the lens array set 300.

Next, the first independent lens group 100 comprising three independent lens units 100a-100c is assembled within the lens barrel 400 with the engaging surfaces 130 on the image-side surfaces engaged with the engaging surfaces 330 on the object side of the lens array set 300, so that the self-alignment of the optical axes of the first independent lens units 100a-100c to the optical axes of the lens units 300a-300c can be effected automatically. The first conjugation surfaces 141 of the first independent lens units 100a-100c are engaged with the first conjugation surfaces 341 on the object side of the lens array set 300 through the second light shielding element 500b, and the second conjugation surfaces 142 of the first independent lens units 100a-100c are directly engaged with the second conjugation surfaces 342 on the object side of the lens array set 300.

Next, the first light shielding element 500a is disposed on the object-side surface of the first independent lens group 100. The press frame 600 is then set within the opening of the lens barrel 400 with the filter 800 disposed thereon so as to complete the assembling of the multiple-layered lens array assembly 10. As shown in FIG. 4, the multiple-layered lens array assembly 10 comprises three optical systems 900a, 900b and 900c, wherein each one of the optical systems 900a-900c has a precisely aligned optical axis. The multiple lenses arranged in a stack in each one of the optical systems 900a-900c will not cause a deterioration or a misalignment of the optical axes of the optical systems 900a-900c, thus the yield rate of the production line is high, and the multiple-layered lens array assembly has a wider range of application.

Figure 8:
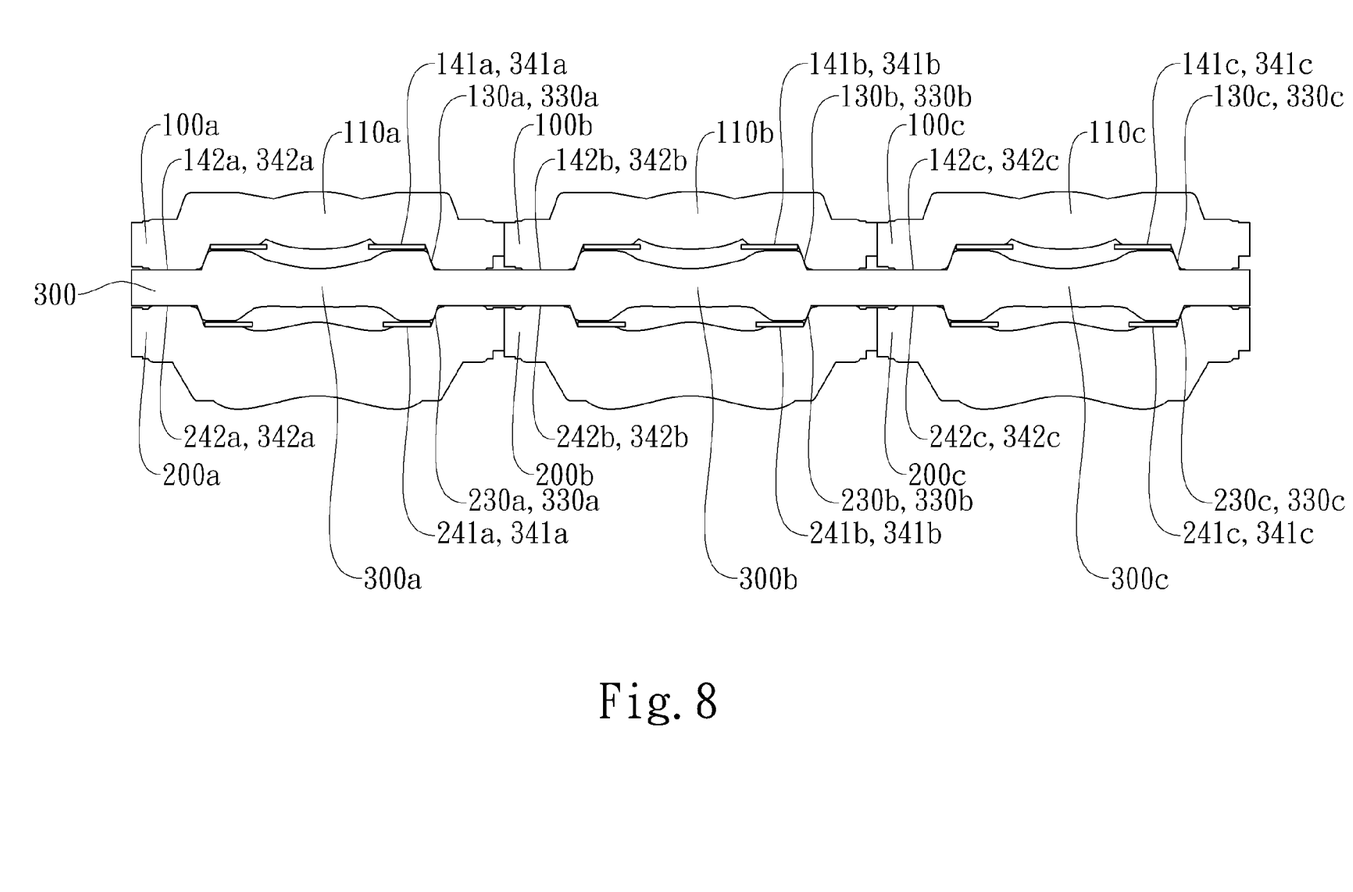
FIG. 8 is schematic cross-sectional view of the multiple-layered lens array assembly in accordance with the embodiment of the present invention shown in FIG. 2.

In summary, as shown in FIG. 8, the image-side surfaces of the first independent lens units 100a-100c are superimposed on the lens array set 300, and the lens array set 300 is superimposed on the object-side surfaces of the second independent lens units 200a-200c. The lens array set 300 comprises the engaging surfaces 330a-330c, the first conjugation surfaces 341a-341c and the second conjugation surfaces 342a-342c, which are respectively co-axial with the optical axes of the lens units 310a-310c of the lens array set 300. Regarding the first independent lens units 100a-100c, the engaging surfaces 130a-130c, the first conjugation surfaces 141a-141c and the second conjugation surfaces 142a-142c, which are respectively co-axial with the optical axes of the lens units 100a-100c, are formed on the image-side surfaces thereof. Regarding the second independent lens units 200a-200c, the engaging surfaces 230a-230c, the first conjugation surfaces 241a-241c and the second conjugation surfaces 242a-242c, which are respectively co-axial with the optical axes of the lens units 200a-200c, are formed on the object-side surfaces thereof. When the assembling of the multiple-layered lens array assembly 10 is carried out, the engaging surfaces 130a-130c and 230a-230c of the first and second independent lens units 100a-100c and 200a-200c are respectively engaged with the engaging surfaces 330a-330c of the lens units 300a-300c, the first conjugation surfaces 141a-141c and 241a-241c of the first and second independent lens units 100a-100c and 200a-200c are respectively engaged with the first conjugation surfaces 341a-341c of the lens units 300a-300c, and the second conjugation surfaces 142a-142c and 242a-242c of the first and second independent lens units 100a-100c and 200a-200c are respectively engaged with the second conjugation surfaces 342a-342c of the lens units 300a-300c. Thus, the precise alignment of the optical axes of the multiple lenses of the multiple-layered lens array assembly can be effected through the engagement of the inclined engaging surfaces and the abutting of the conjugation surfaces together. Optionally, the multiple-layered lens array assembly 10 can further be cut to form a desired multiple-layered lens unit.

The aforementioned embodiment of the present invention is exemplary and is not intended to limit the scope of the present invention. Those ordinarily skilled in the art will understand that various modifications or alterations that achieve equivalent effect may be made thereto within the scope and spirit of the appended claims and that the configurations with such modifications or alterations fall within the scope of the present invention.

What is claimed is:

1. A multiple-layered lens array assembly, comprising:
    a lens array set comprising a plurality of lens units as a whole, each of the lens units having an engaging surface surrounding an optical axis thereof and formed on an object-side surface or an image-side surface thereof; and
    an independent single-lens unit having a single-lens optical axis and an engaging surface formed on an object-side surface or an image-side surface thereof and surrounding the single-lens optical axis, wherein the engaging surface of the independent single-lens unit is engaged with the engaging surface of a corresponding lens unit of the lens array set.

2. The multiple-layered lens array assembly of claim 1, wherein the independent single-lens unit is capable of engaging with another independent single-lens unit.

3. The multiple-layered lens array assembly of claim 1, wherein the engaging surfaces of the lens units of the lens array set are transcribed by a unibody mold tool.

4. The multiple-layered lens array assembly of claim 1, wherein the engaging surface of the independent single-lens unit is transcribed by a unibody mold tool.

5. The multiple-layered lens array assembly of claim 4, wherein the independent single-lens unit further comprises an ejecting surface located at a height lower than the engaging surface thereof.

6. The multiple-layered lens array assembly of claim 1, wherein the engaging surface of each of the lens units of the lens array set extends outward, and the engaging surface of the independent single-lens unit extends inward corresponding to the engaging surface of the lens array set.

7. The multiple-layered lens array assembly of claim 1, wherein the engaging surface of the independent single-lens unit further comprises a middle portion and two end portions, wherein the middle portion has a curvature corresponding to the optical axis of the independent single-lens unit, each of the two end portions has a curvature, and the curvature of each of the two end portions is smaller than the curvature of the middle portion.

8. The multiple-layered lens array assembly of claim 1 further comprising at least a light shielding element array disposed above or under the lens array set and the independent single-lens unit.

9. The multiple-layered lens array assembly of claim 1 further comprising a lens barrel.

10. The multiple-layered lens array assembly of claim 9, wherein an outer periphery of the lens array set is engaged with inner walls of the lens barrel.

11. The multiple-layered lens array assembly of claim 9, wherein the lens array set and the at least an independent single-lens unit are assembled within the lens barrel in an order along a single direction.

12. The multiple-layered lens array assembly of claim 9 further comprising at least a light shielding element array disposed above or under the lens array set and the independent single-lens unit.

13. The multiple-layered lens array assembly of claim 12, wherein the light shielding element array is positioned by the inner walls of the lens barrel.

14. A multiple-layered lens array assembly, comprising:
    at least a lens array set comprising a plurality of lens units, each of the lens units having an engaging surface surrounding an optical axis thereof and formed on an object-side surface or an image-side surface thereof; and
    at least an independent lens unit having an engaging surface surrounding an optical axis thereof and formed on an object-side surface or an image-side surface thereof, wherein the engaging surface of the at least an independent lens unit is engaged with the engaging surface of a corresponding lens unit of the at least a lens array set,
    wherein the engaging surface of the at least an independent lens unit further comprises a middle portion and two end portions, wherein the middle portion has a curvature corresponding to the optical axis of the at least an independent lens unit, each of the two end portions has a curvature, and the curvature of each of the two end portions is smaller than the curvature of the middle portion.

* * * * *